United States Patent [19]
Reyes

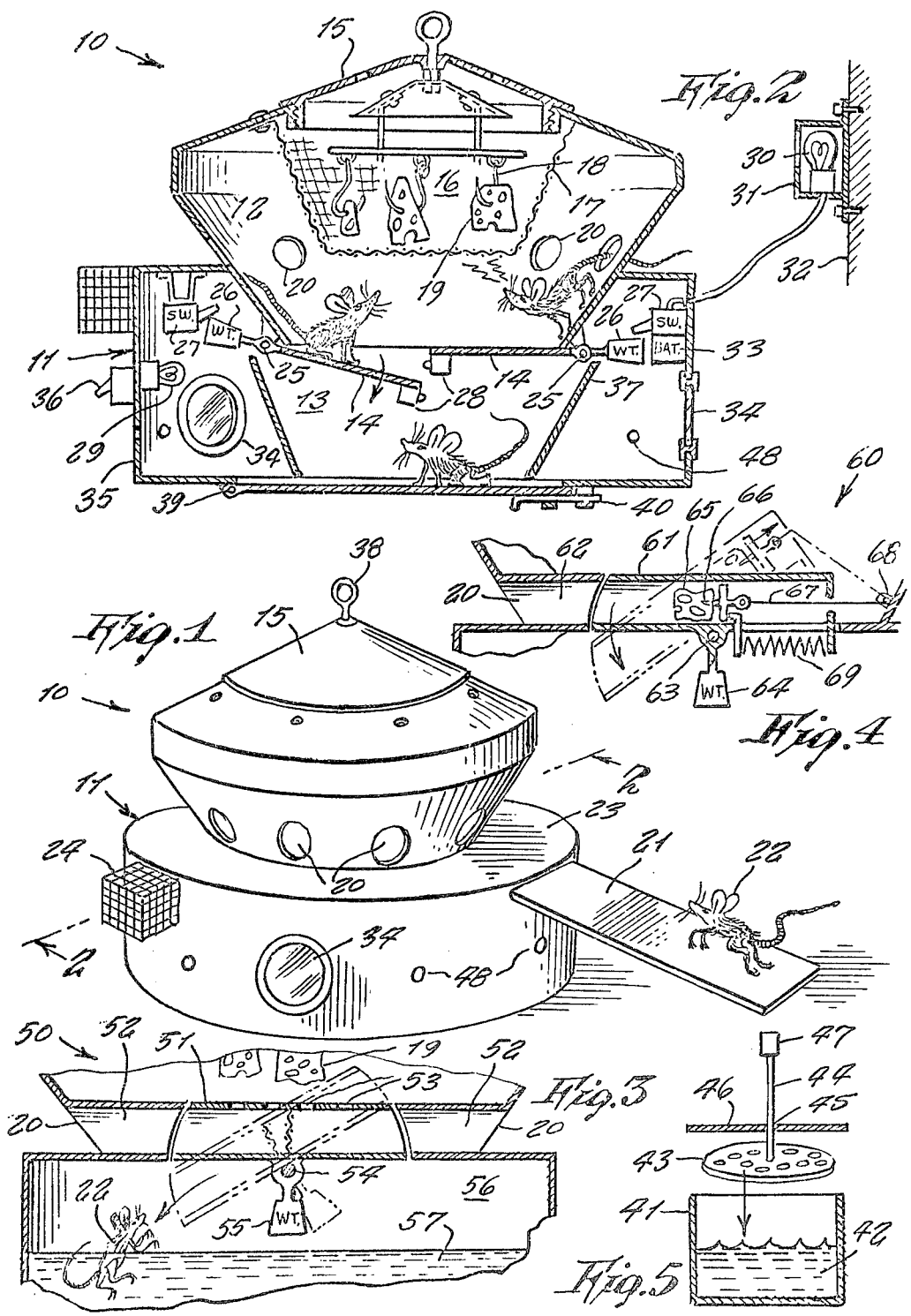

[11] 4,154,016
[45] May 15, 1979

[54] MOUSE TRAP WITH BAIT HOLDING TILT TUBE

[76] Inventor: Daniel Reyes, c/o George Spector, 3615 Woolworth Bldg., 233 Broadway, New York, N.Y. 10007

[21] Appl. No.: 762,315

[22] Filed: Jan. 25, 1977

[51] Int. Cl.² .......................................... A01M 23/04
[52] U.S. Cl. ........................................................ 43/69
[58] Field of Search ............ 43/58, 60, 61, 62, 64–67, 43/69, 70, 73, 76

[56] References Cited

U.S. PATENT DOCUMENTS

| 1,428,918 | 9/1922 | Spieth | 43/69 |
| 1,514,770 | 11/1924 | Kilchar | 43/69 |
| 1,820,579 | 8/1931 | Nakagawa | 43/69 |
| 2,490,540 | 12/1949 | Price | 43/69 |
| 2,584,498 | 2/1952 | Posey | 43/69 |
| 3,778,922 | 12/1973 | Clark | 43/61 |
| 3,778,923 | 12/1973 | Cuoco | 43/69 |
| 3,936,972 | 2/1976 | Meyers et al. | 43/69 |

FOREIGN PATENT DOCUMENTS

| 606483 | 1926 | France | 43/64 |
| 164631 | 1921 | United Kingdom | 43/69 |

Primary Examiner—Ronald E. Suter

[57] ABSTRACT

A mouse or rat trap of improved design, including a hollow container into which the animals are lured by baited cheese, the interior having trap doors through which the animals drop into a lower chamber, the trap doors closing electric circuits to lamps so to illuminate the chamber so a person can see inside through windows, a bottom door locked by a latch serving to dump the animals after being drowned in water.

1 Claim, 5 Drawing Figures

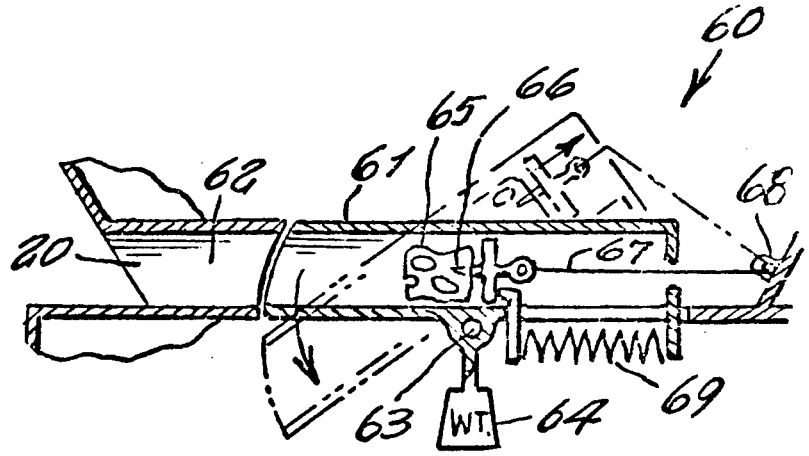

MOUSE TRAP WITH BAIT HOLDING TILT TUBE

This invention relates to mouse and rat traps.

A principal object of the present invention is to provide an improved trap for catching a large number of mice or rats and which permits easy distribution and disposal thereof.

Another object is to provide a trap that is illuminated inside when entered by animals and which has windows so a person can see the animals inside.

Other objects are to provide an improved mouse trap which is simple in design, inexpensive to manufacture, rugged in construction, easy to use and efficient in operation.

These and other objects will be readily evident upon a study of the following specification and the accompanying drawing wherein:

FIG. 1 is a perspective view of the improved mouse trap.

FIG. 2 is a cross-sectional view thereof taken on line 2—2 of FIG. 1.

FIG. 3 is a similar view shown fragmentary and illustrating a modified design thereof.

FIG. 4 is a view similar to FIG. 3 and illustrating still another modified design.

FIG. 5 is a cross-sectional view of a tank in which mice dropped from the trap may be drowned.

Referring now to the drawing in greater detail, and more particularly to FIGS. 1 and 2 thereof at this time, the reference numeral 10 represents an improved mouse trap according to the present invention wherein there is a hollow container 11 having an upper chamber 12 and lower chamber 13 separated by trap doors 14 therebetween.

A removeable lid 15 on an upper end of the container allows access to a bait area 16 enclosed by a screen 17. Hooks 18 suspended from an underside of the lid serve to hold baited cheese, bacon or other foods 19 so to attract mice to enter the chamber 12 through openings 20.

A gang plank 21 may be attached to the container outside so mice 22 can climb on platform 23 so to reach the openings 20.

A cage 24 outside the container also serves to hold bait so to attract mice into the vicinity of the trap 10.

Each trap door is downwardly pivotable about a pivot pin 25 when a mouse steps upon it while trying to get closer to the bait 19, thus causing the mice to drop into lower chamber 13. Each trap door has a counterbalanced weight 26 that normally holds the trap door in raised, closed position. Switches 26 and 27 automatically are operated by the trap doors when downwardly pivoted so to close an electric circuit to lamps 29 inside the container and a lamp 30 inside a control box 31 mounted on a wall 32 of a room. Dry cell batteries 33 power the circuit. Windows 34 in side walls 35 of the container allow a person to look inside. The lamps 29 can be also manually turned on by an external switch 36. Latch members 28 normally retain the trap doors horizontal until a mouse contacts the doors 14.

Downwardly converging, inclined, transparent walls 37 inside lower chamber 13 confine mice to stand on a bottom door 38 pivotable about hinge pin 39 and held by latch 40, so that when the door is opened, the mice can be dropped from the trap into a container 41 (shown in FIG. 5) containing water 42 so to drown the captured mice. A perforated plate 43 that fits inside the container 41 serves to hold the mice underwater. A handle 44 extends upward from the plate 43 and through a hole 45 of a lid 46. An upper end of the handle has a knob 47.

Alternately the lower portion of the container 11 can be lowered into water so that water enters the lower chamber through ports 48 so to drown the mice which are then dumped out dead through bottom door 38.

In a modified design of the trap 50 shown in FIG. 3, the above described trap doors 14 are substituted by a tube 51 that aligns with passages 52 leading from openings 20, so that a mouse entering the container in search of bait 19 steps into the tube. Holes 53 in the tube allow the bait scent to enter the same.

The tube 51 is pivotable about a pivot pin 54 and is normally held in horizontal position by a counterweight 55 integral therewith. When a mouse enters either end of the tube, the tube thus automatically tilts so to disalign with passage 52, and let the mouse fall out into lower chamber 56 containing water 57 in which the mouse drowns. The empty tube returns to horizontal position so to be ready for a next mouse.

In FIG. 4, another design of trap 60 includes tube 61 that aligns with passage 62 leading from opening 20', the tube being pivotable about pin 63 and being integral with counterweight 64. In this design a bait 65 is placed inside the tube so to appear more accessible to a mouse, the bait being attached to a hook 66 connected by string 67 to a stationary eyelet 68. In use, as a mouse enters the tube (from one end only), the tube tilts thus causing the bait to be pulled backwardly inside the tube progressively as the tube further tilts so the mouse cannot reach it. The mouse falls from the tube into water as described above for FIG. 3, instead. A spring mechanism 69 slides the bait then back into reset position so to be ready for a next mouse.

While various changes may be made in the detail construction, it is understood that such changes will be within the spirit and scope of the present invention, as is defined by the appended claims.

What is claimed is:

1. In an improved mouse trap, the combination of a container having an upper and lower chamber, said upper chamber having openings all around so mice can enter therethrough, means for said mice to drop into said lower chamber, and a pivotable bottom door on a bottom of said container held closed by a latch wherein said means comprises a pivotable tube aligned with a passage from each said opening, said tube being counter balanced by a weight, wherein a bait inside said tube is on a hook connected by a string extending through one end of said tube to a stationary eyelet, and a spring mechanism for sliding said hook in a direction toward an opposite end of said tube which communicates with said passage and said opening.

* * * * *